(12) United States Patent
Franzel et al.

(10) Patent No.: US 12,225,884 B1
(45) Date of Patent: Feb. 18, 2025

(54) DOG LOCATING DEVICE TO BE WORN BY A HUNTING DOG

(71) Applicant: Dave's Hunting Equipment LLC, Ubly, MI (US)

(72) Inventors: David Richard Franzel, Ubly, MI (US); Victor Arroyo, III, Ubly, MI (US)

(73) Assignee: DAVE'S HUNTING EQUIPMENT LLC, Ubly, MI (US)

( * ) Notice: Subject to any disclaimer, the term of this patent is extended or adjusted under 35 U.S.C. 154(b) by 6 days.

(21) Appl. No.: 18/127,822

(22) Filed: Mar. 29, 2023

(51) Int. Cl.
*A01K 27/00* (2006.01)
*A01K 11/00* (2006.01)

(52) U.S. Cl.
CPC ............ *A01K 27/006* (2013.01); *A01K 11/00* (2013.01); *A01K 27/002* (2013.01)

(58) Field of Classification Search
CPC ............................. A01K 27/002; A01K 27/006
See application file for complete search history.

(56) References Cited

U.S. PATENT DOCUMENTS

| | | | | |
|---|---|---|---|---|
| 3,241,516 A * | 3/1966 | Hopkins | ............... | H01F 7/0252 |
| 5,199,383 A * | 4/1993 | Lagana | ................. | A01K 27/00 |
| | | | | 119/96 |
| 5,746,158 A * | 5/1998 | Landherr | ............... | A01K 29/00 |
| | | | | 119/858 |
| 5,918,611 A * | 6/1999 | Amato | ..................... | A01K 1/06 |
| | | | | 135/16 |
| 7,021,246 B2 * | 4/2006 | Seymour | ................ | A01K 29/00 |
| | | | | 119/850 |
| 9,376,183 B2 * | 6/2016 | Cannici | ................... | B63B 45/00 |
| 2023/0200354 A1 * | 6/2023 | Gilmore | ................ | A01K 27/00 |

\* cited by examiner

*Primary Examiner* — Joshua J Michener
*Assistant Examiner* — Henry Hooper Mudd
(74) *Attorney, Agent, or Firm* — Carlson, Gaskey & Olds, P.C.

(57) ABSTRACT

A dog locating device to be worn by a hunting dog is provided. The device includes a back pad having a front end portion and a rear end portion thereof. The device includes an abdomen pad having a front end portion and a rear end portion thereof. The device includes first and second adjustable straps coupled between the front end portion of the back pad and the front end portion of the abdomen pad. The device further includes third and fourth adjustable straps coupled between the rear end portion of the back pad and the rear end portion of the abdomen pad. The device includes a plate that is coupled to the back pad. The device includes a spring member that is coupled to the plate, and a flag mounting bracket that is coupled to the spring member.

19 Claims, 18 Drawing Sheets

DOG LOCATING DEVICE TO BE WORN BY A HUNTING DOG

BACKGROUND

Hunters often utilize dogs to assist them in several types of hunting (e.g., duck, quail, rabbit, pheasant, and coyote hunting). Too often, hunters lose sight of their hunting dogs due to the height of the grass or other natural elements. Additionally, due to the elevated adrenaline and speed involved, hunters can mistakenly think that the movement in the grass is wild game and inadvertently shoot their hunting dogs.

The inventors herein have recognized a need for an improved dog locating device that can be worn by a hunting dog that minimizes and/or reduces the above-mentioned problem.

SUMMARY

A dog locating device to be worn by a hunting dog in accordance with an exemplary embodiment is provided. The dog locating device includes a back pad having a front end portion and a rear end portion thereof. The dog locating device further includes an abdomen pad having a front end portion and a rear end portion thereof. The dog locating device further includes a first adjustable strap coupled to and between the front end portion of the back pad and the front end portion of the abdomen pad. The dog locating device further includes a second adjustable strap that is coupled to and between the front end portion of the back pad and the front end portion of the abdomen pad. The first adjustable strap, the second adjustable strap, the back pad, and the abdomen pad form a first opening that is sized and shaped to receive a head of the hunting dog therethrough. The dog locating device further includes a third adjustable strap coupled to and between the rear end portion of the back pad and the rear end portion of the abdomen pad. The dog locating device further includes a fourth adjustable strap coupled to and between the rear end portion of the back pad and the rear end portion of the abdomen pad. The third adjustable strap, the fourth adjustable strap, the back pad, and the abdomen pad form a second opening that is sized and shaped to receive a back and an abdomen of the hunting dog therethrough. The dog locating device further includes a plate that is coupled to the back pad. The dog locating device further includes a spring member that is coupled to the plate. The dog locating device further includes a flag mounting bracket that is coupled to the spring member.

A dog locating device to be worn by a hunting dog in accordance with another exemplary embodiment is provided. The dog locating device includes a back pad having a front end portion and a rear end portion thereof. The dog locating device further includes an abdomen pad having a front end portion and a rear end portion thereof. The dog locating device further includes a first strap that is coupled to and between the front end portion of the back pad and the front end portion of the abdomen pad. The dog locating device further includes a second strap that is coupled to and between the front end portion of the back pad and the front end portion of the abdomen pad. The first strap, the second strap, the back pad, and the abdomen pad form a first opening that is sized and shaped to receive a head of the hunting dog therethrough. The dog locating device further includes a third strap that is coupled to and between the rear end portion of the back pad and the rear end portion of the abdomen pad. The dog locating device further includes a fourth strap that is coupled to and between the rear end portion of the back pad and the rear end portion of the abdomen pad. The third strap, the fourth strap, the back pad, and the abdomen pad form a second opening that is sized and shaped to receive a back and an abdomen of the hunting dog therethrough. The dog locating device further includes a plate that is coupled to the back pad. The dog locating device further includes a spring member that is coupled to the plate. The dog locating device further includes a flag mounting bracket that is coupled to the spring member.

DETAILED DESCRIPTION

Figure 1:
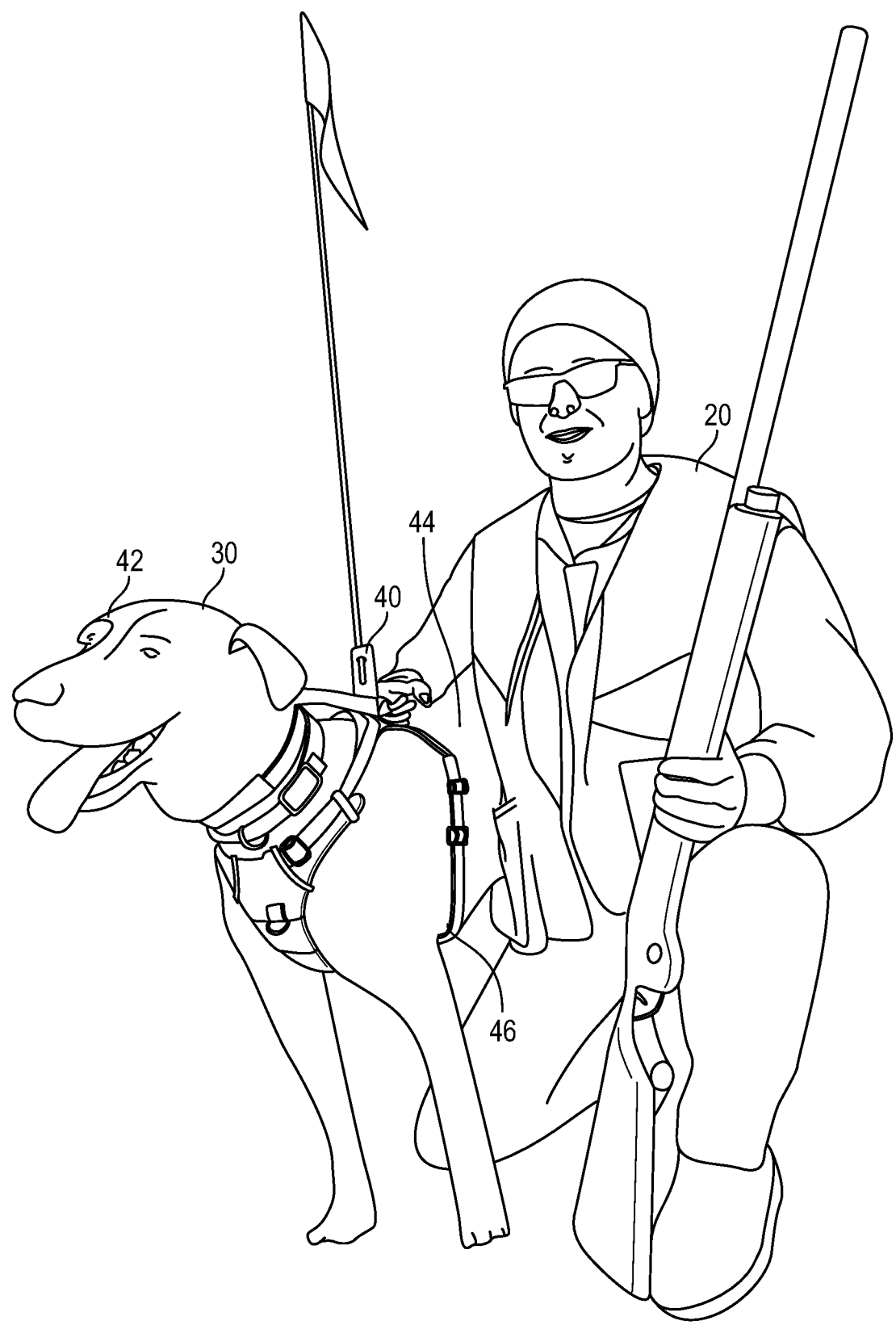
FIG. 1 is a schematic of a hunter, a hunting dog, and a dog locating device coupled to the hunting dog in accordance with an exemplary embodiment.

Referring to FIG. 1, a hunter 20, a hunting dog 30, and a dog locating device 40 in accordance with an exemplary embodiment is coupled to the hunting dog 30. The hunting dog 30 has a head 42 an abdomen 46.

Figure 17:
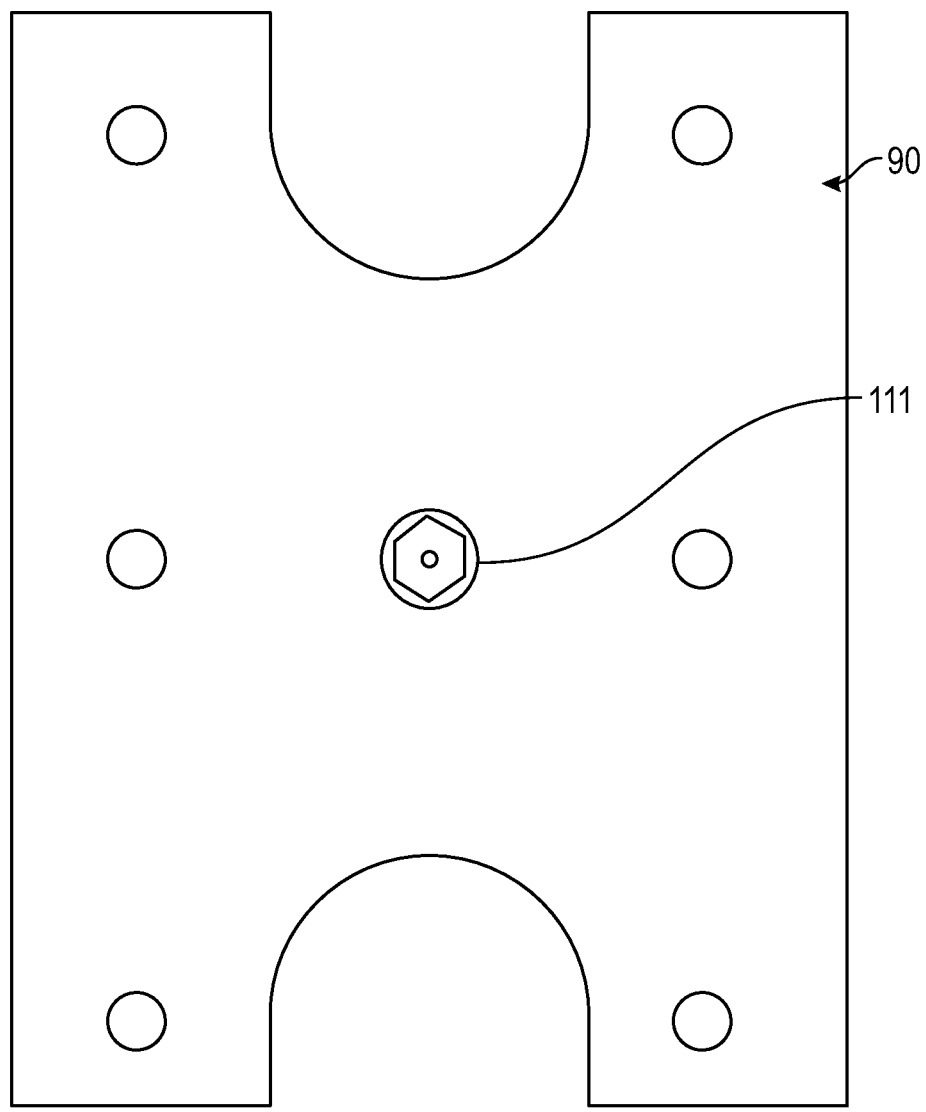
FIG. 17 is a bottom view of the plate of FIG. 13 having a first bolt disposed therethrough.

Referring to FIGS. 1-12, the dog locating device 40 is worn by the hunting dog 30 is provided to allow the hunter 20 to easily locate the hunting dog 30 when hunting. Referring to FIGS. 2-5, the dog locating device 40 includes a back pad 60, an abdomen pad 64, a first adjustable strap 71, a second adjustable strap 72, a third adjustable strap 73, a fourth adjustable strap 74, a plate 90, a spring member 94, a flag mounting bracket 98, first, second, third and fourth rivets 101, 102, 103, 104 (shown in FIG. 9), first and second bolts 111, 112 (shown in FIG. 17), a flag 120, a hand strap 122 (shown in FIGS. 9 and 10), coupling rings 131, 132, a lower strap 140, a coupling ring 144, and first and second guide loops 151, 152 (shown in FIGS. 3 and 7).

An advantage of the dog locating device 40 is that the device 40 utilizes the spring member 94 that allows the flag mounting bracket 98 and the flag 120 to bend when the flag 120 contacts objects such as brush or branches. As a result, when the hunting dog 30 is running through brush or branches, the spring member 94 absorbs some of the force such that the dog is not jerked backwardly by the brush or branches which could injure the dog 30 if the dog 30 is running a high speed. Further, the spring member 94 allows the flag 120 to bend backwardly such that the flag 120 does not easily break when the flag 120 contacts brush or branches.

The term "spring member" means a member having at least a portion of which is a spring that that can be bent, pressed, or pulled but returns to a former shape thereof when released.

Figure 8:
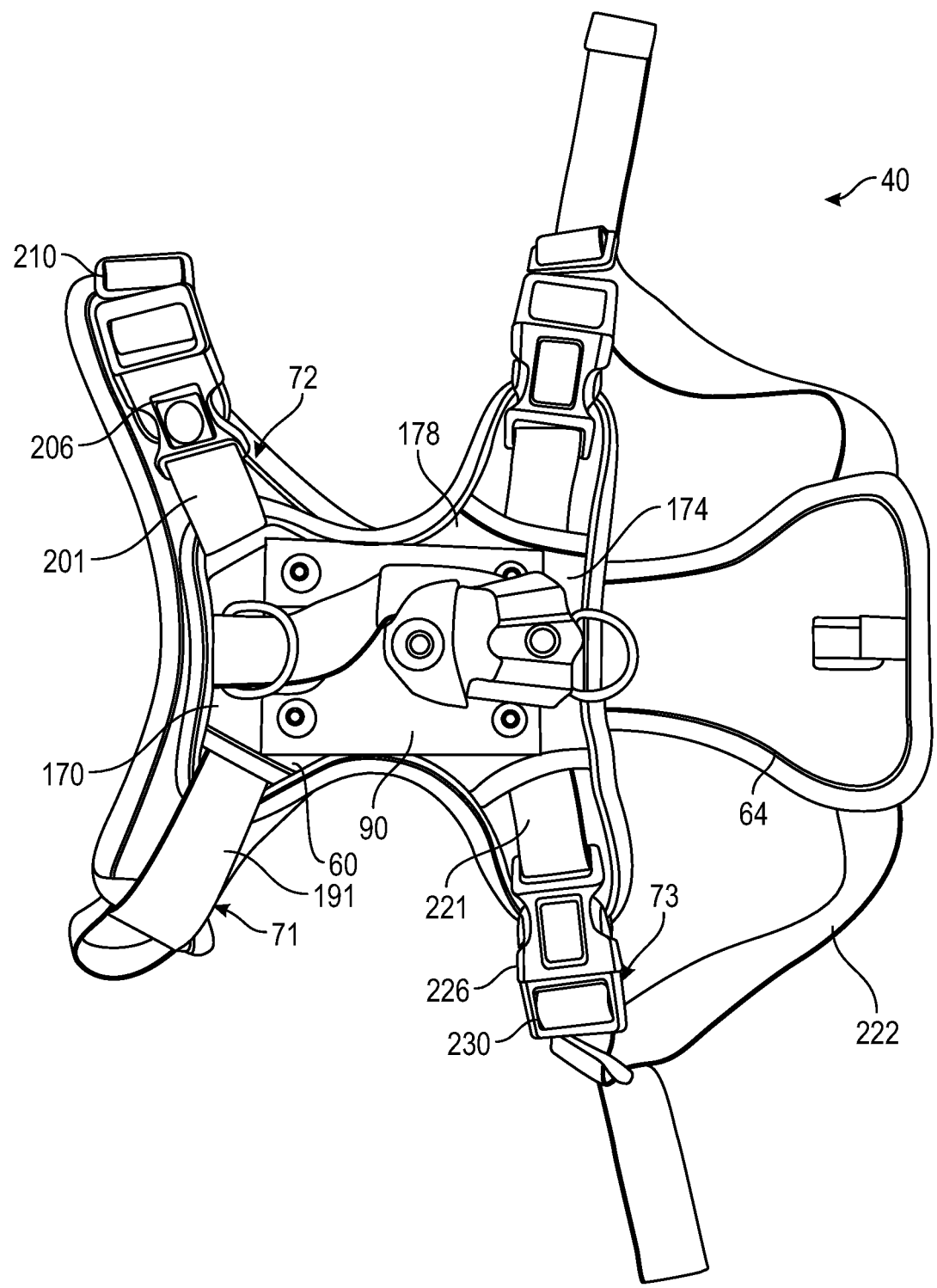
FIG. 8 is a top view of the dog locating device of FIG. 5 when the device has a stored position.
Figure 12:
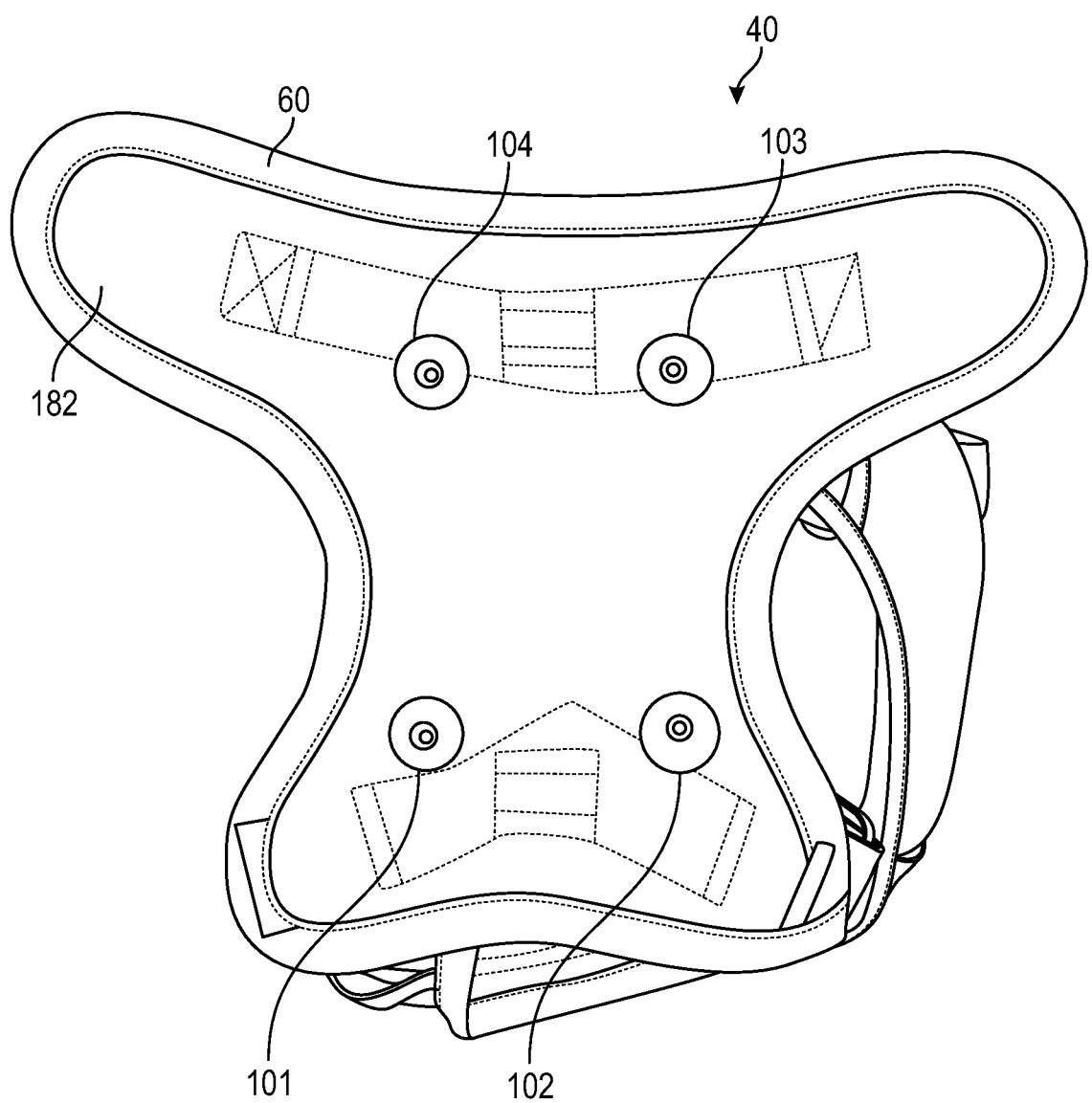
FIG. 12 is a bottom view of a back pad utilized in the dog locating device of FIG. 8.
Figure 13:
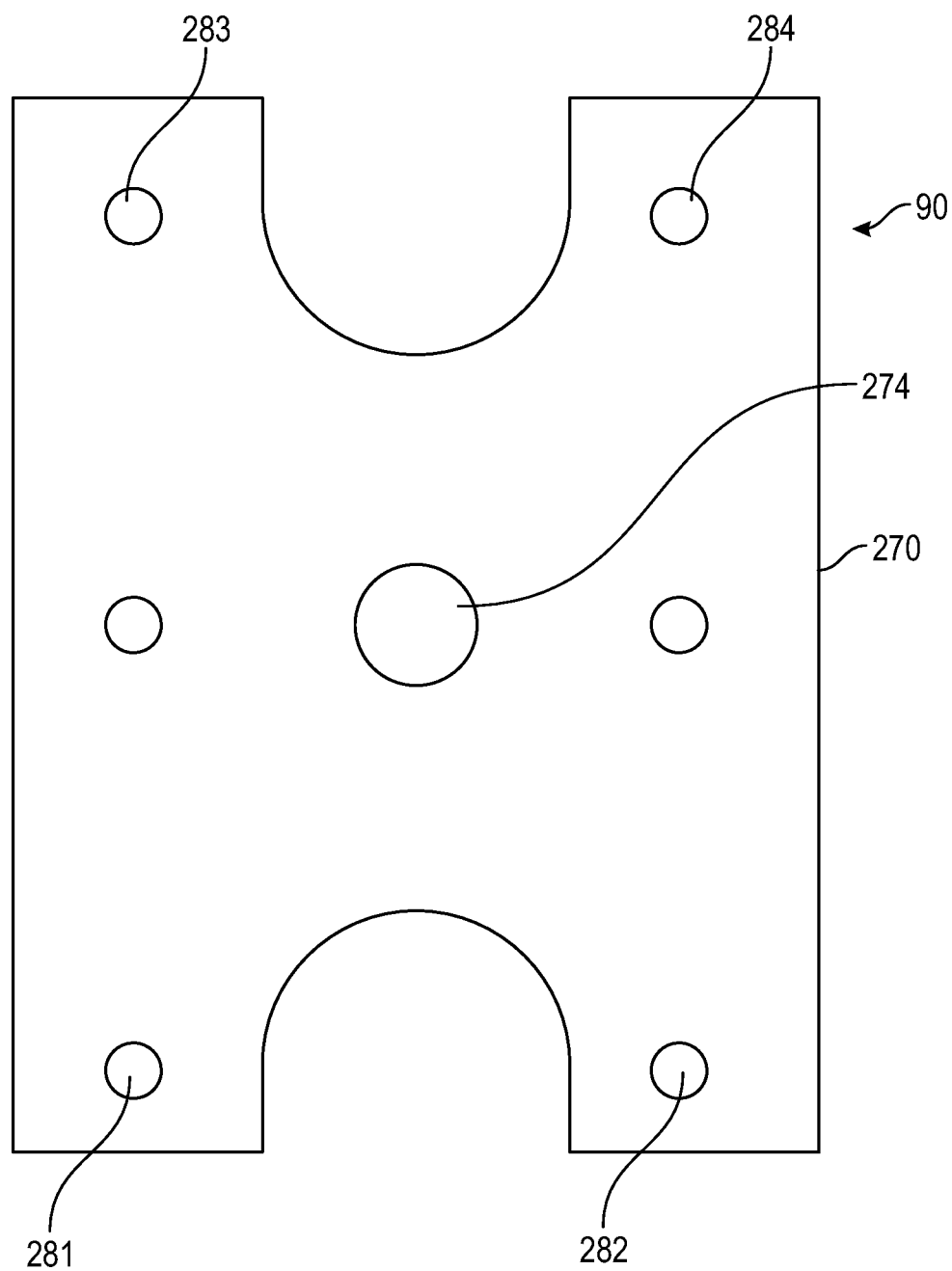
FIG. 13 is a top view of a plate utilized in the dog locating device of FIG. 8.
Figure 14:
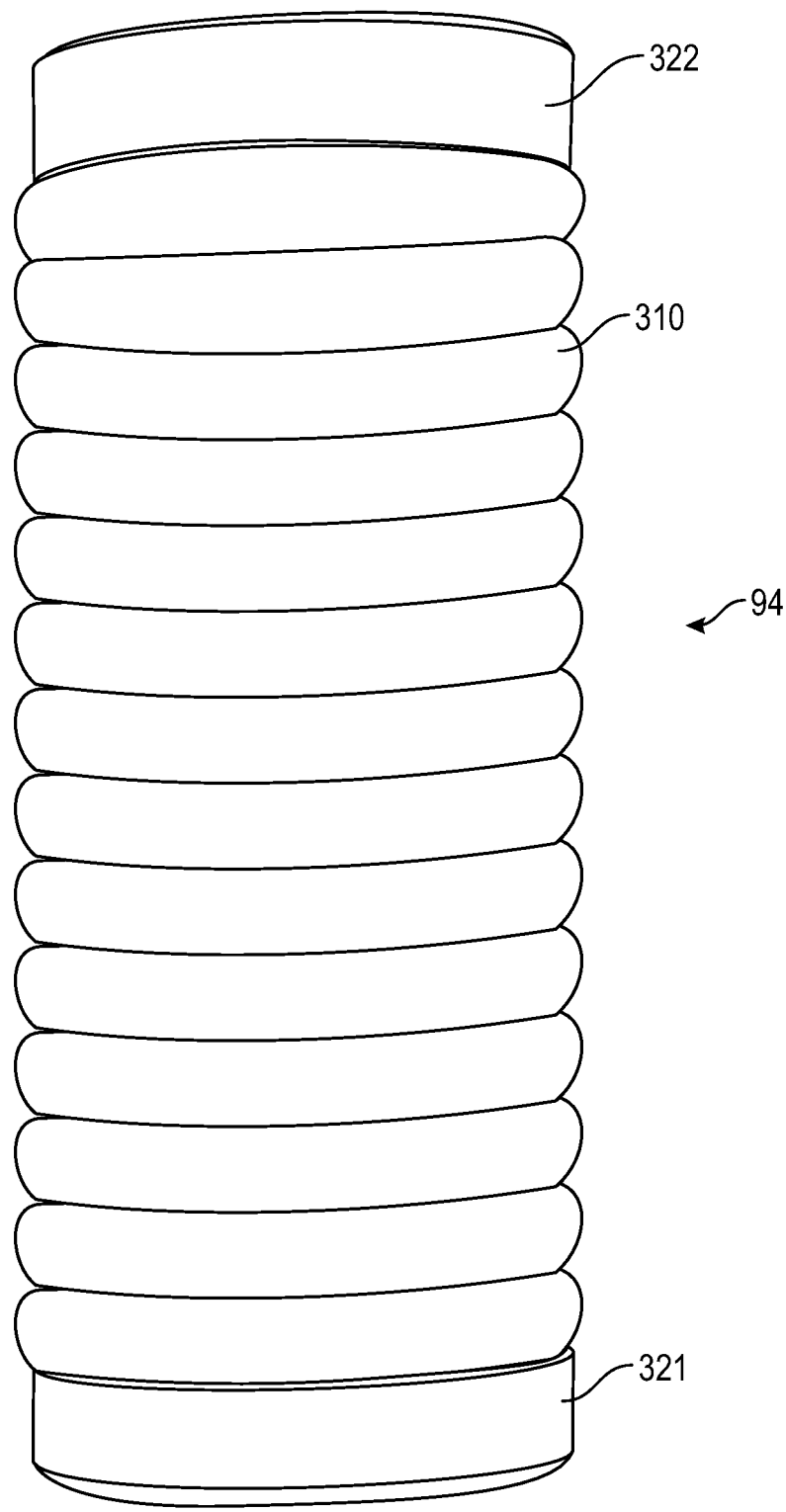
FIG. 14 is a front view of a spring member utilized in the dog locating device of FIG. 8.

Referring to FIGS. 8 and 12, the back pad 60 includes a front end portion 170, a rear end portion 174, a top surface 178, and a bottom surface 182. The back pad 60 is sized and shaped to be received on the back 44 (shown in FIG. 1) of the hunting dog 30. In particular, the bottom surface 182 contacts the back 44 of the hunting dog 30. The top surface 178 receives the plate 90 thereon. In an exemplary embodiment, the back pad 60 is constructed of a flexible cloth material that conforms to the shape of the back 44 of the hunting dog 30 for comfort.

Figure 4:
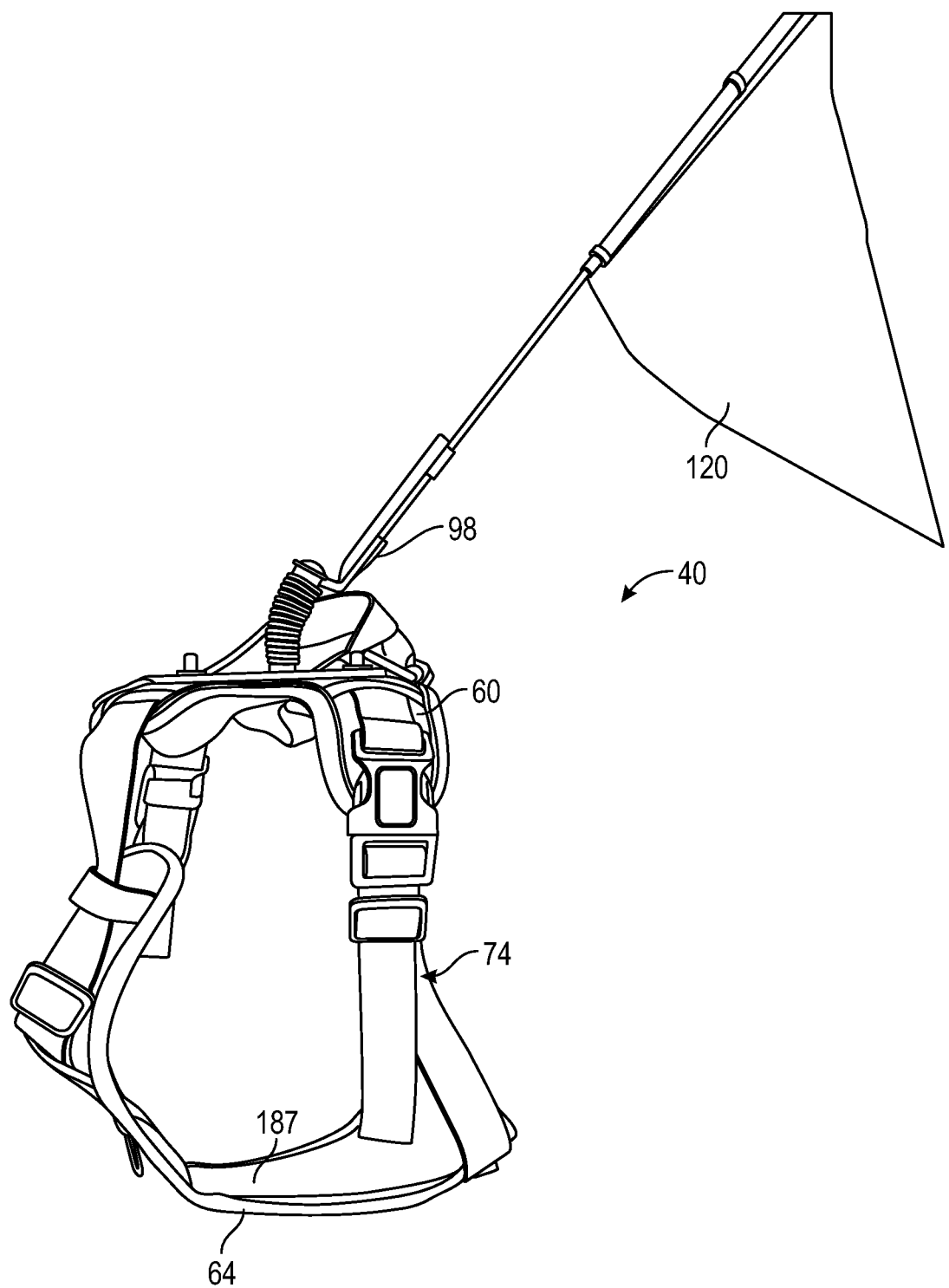
FIG. 4 is another side view of the dog locating device of FIG. 2 with a spring member in a bent position.
Figure 11:
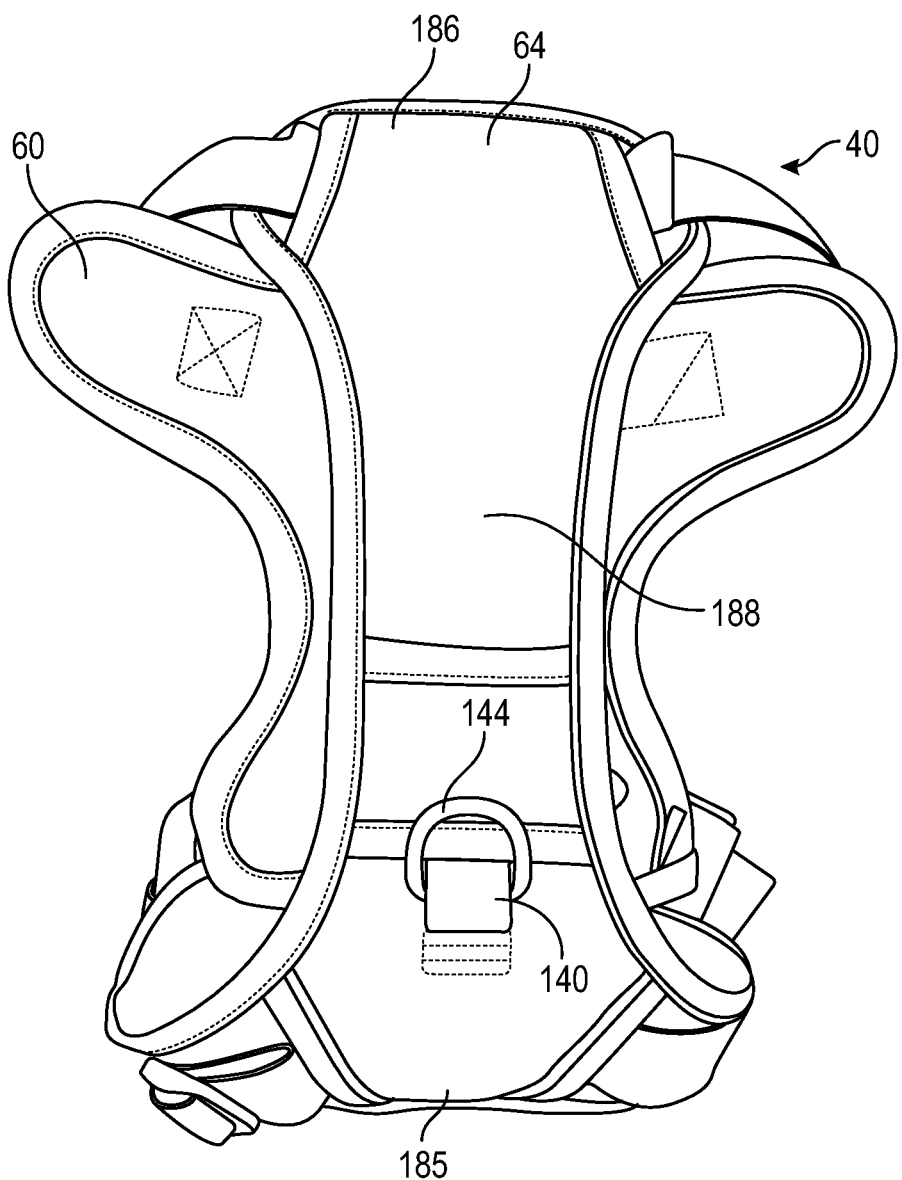
FIG. 11 is a bottom view of the dog locating device of FIG. 8.

Referring to FIGS. 4 and 11, the abdomen pad 64 includes a front end portion 185, a rear end portion 186, a top surface 187, and a bottom surface 188. The abdomen pad 64 is sized and shaped to be received on the abdomen 46 (shown in FIG. 1) of the hunting dog 30. In particular, the top surface 187 contacts the abdomen 46 of the hunting dog 30. In an exemplary embodiment, the abdomen pad 64 is constructed of a flexible cloth material that conforms to the shape of the abdomen 46 of the hunting dog 30 for comfort.

Figure 3:
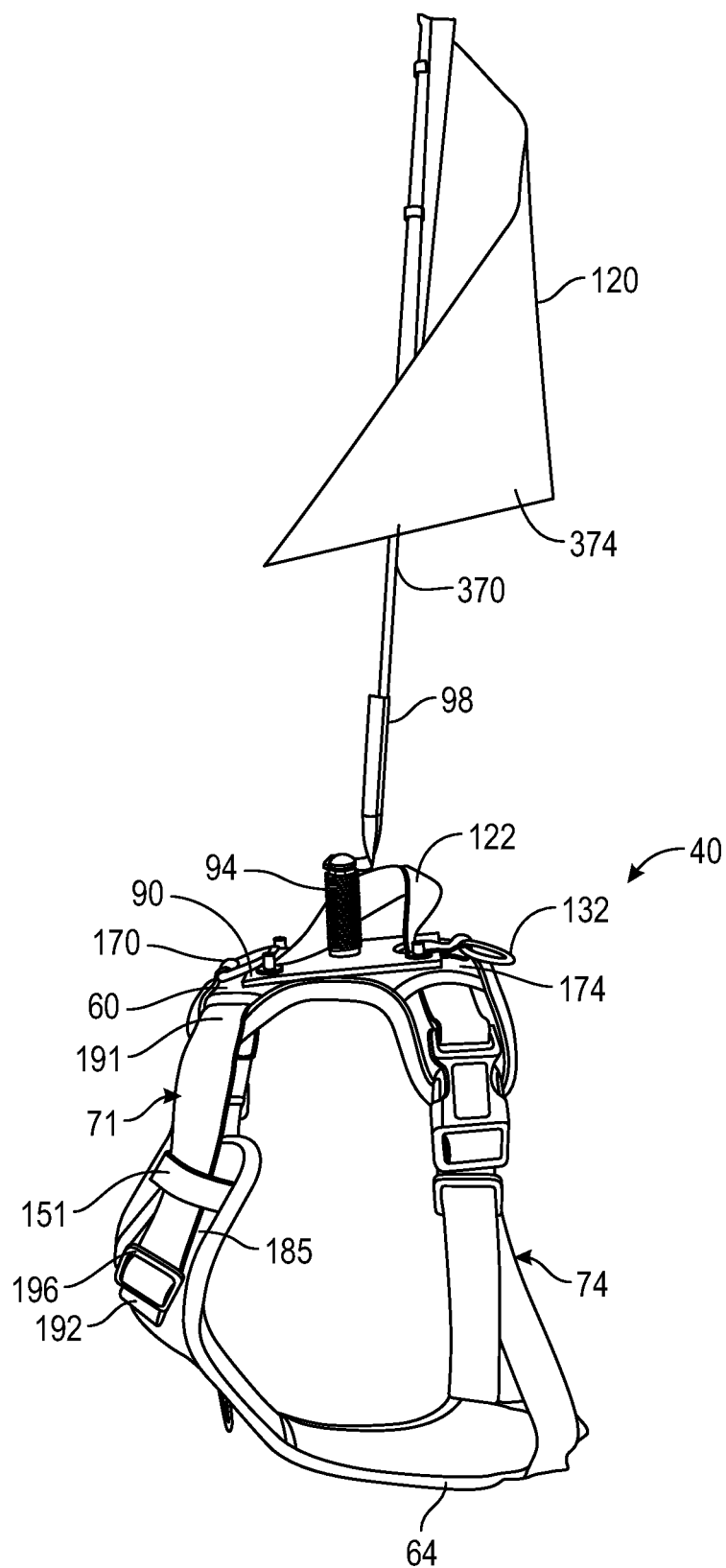
FIG. 3 is a side view of the dog locating device of FIG. 2 with a spring member in a non-bent position.

Referring to FIGS. 3 and 8, the first adjustable strap 71 is coupled to and between the front end portion 170 of the back pad 60 and the front end portion 185 of the abdomen pad 64. The first adjustable strap 71 includes a first strap portion 191, a second strap portion 192, and an adjustment buckle 196. The first strap portion 191 is coupled to the front end portion 170 of the back pad 60. The first strap portion 191 further extends through a first guide loop 151 on the abdomen pad 64 and is coupled to the adjustment buckle 196. The second strap portion 192 is further coupled to and between the adjustment buckle 196 and the front end portion 185 of the abdomen pad 64. The adjustment buckle 196 allows a user to adjust an effective length of the first adjustable strap 71.

Figure 7:
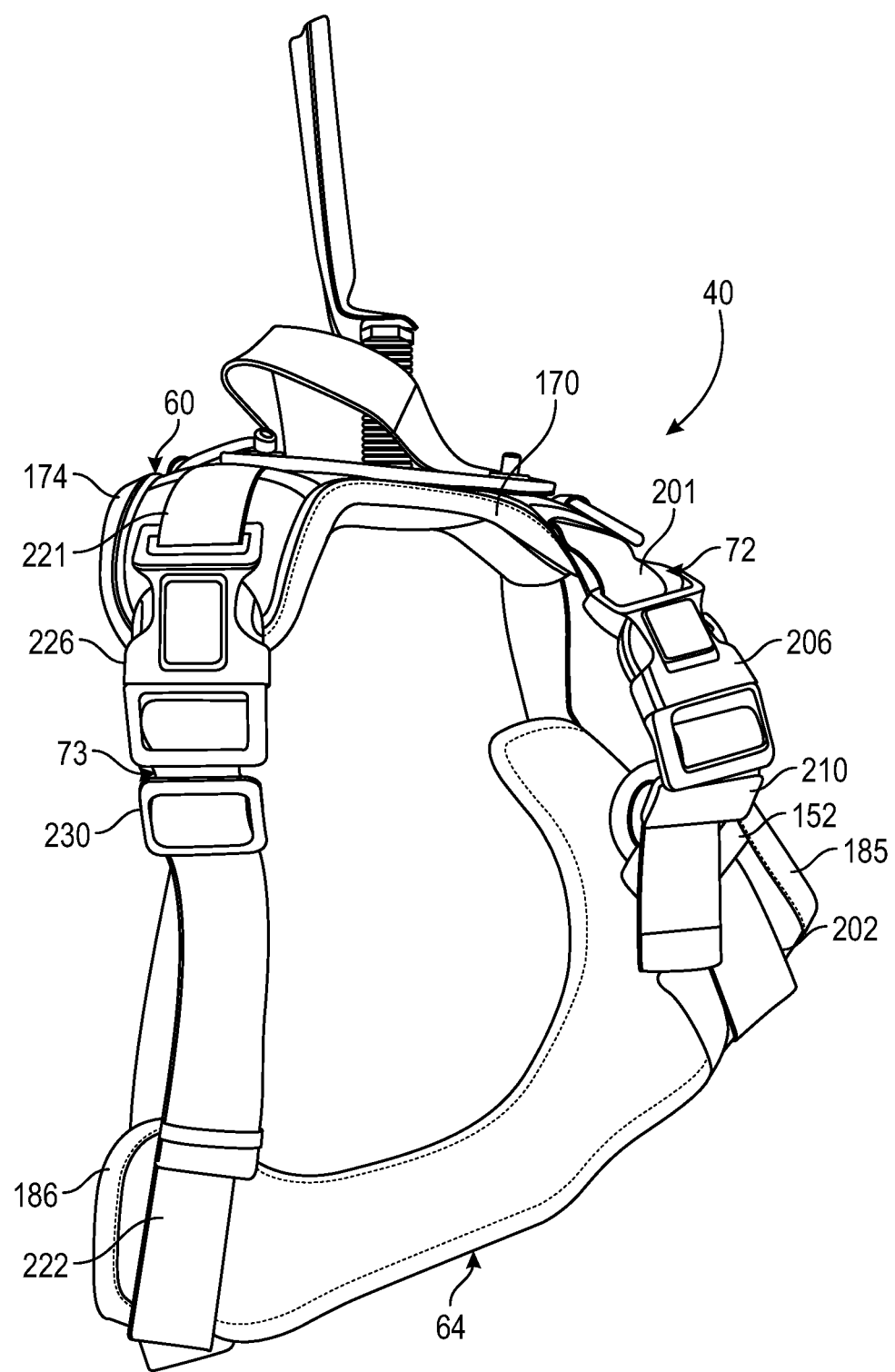
FIG. 7 is a second side view of the dog locating device of FIG. 5.

Referring to FIGS. 3, 7 and 8, the second adjustable strap 72 is coupled to and between the front end portion 170 of the back pad 60 and the front end portion 185 of the abdomen pad 64. The second adjustable strap 72 includes a first strap portion 201, a second strap portion 202, a releasable buckle 206, and an adjustment buckle 210. The first strap portion 201 is coupled to and between the front end portion 170 of the back pad 60 and the releasable buckle 206. The second strap portion 202 is coupled to and between the releasable buckle 206 and the adjustment buckle 210, and further extends from the adjustment buckle 210 and through a second guide loop 152 on the abdomen pad 64. The second strap portion 202 is further coupled to the abdomen pad 64. The adjustment buckle 210 allows a user to adjust an effective length of the second adjustable strap 72. The releasable buckle 206 allows a user to temporarily decouple the first strap portion 201 from the second strap portion 202 when placing the dog locating device 40 on the hunting dog 30.

Figure 5:
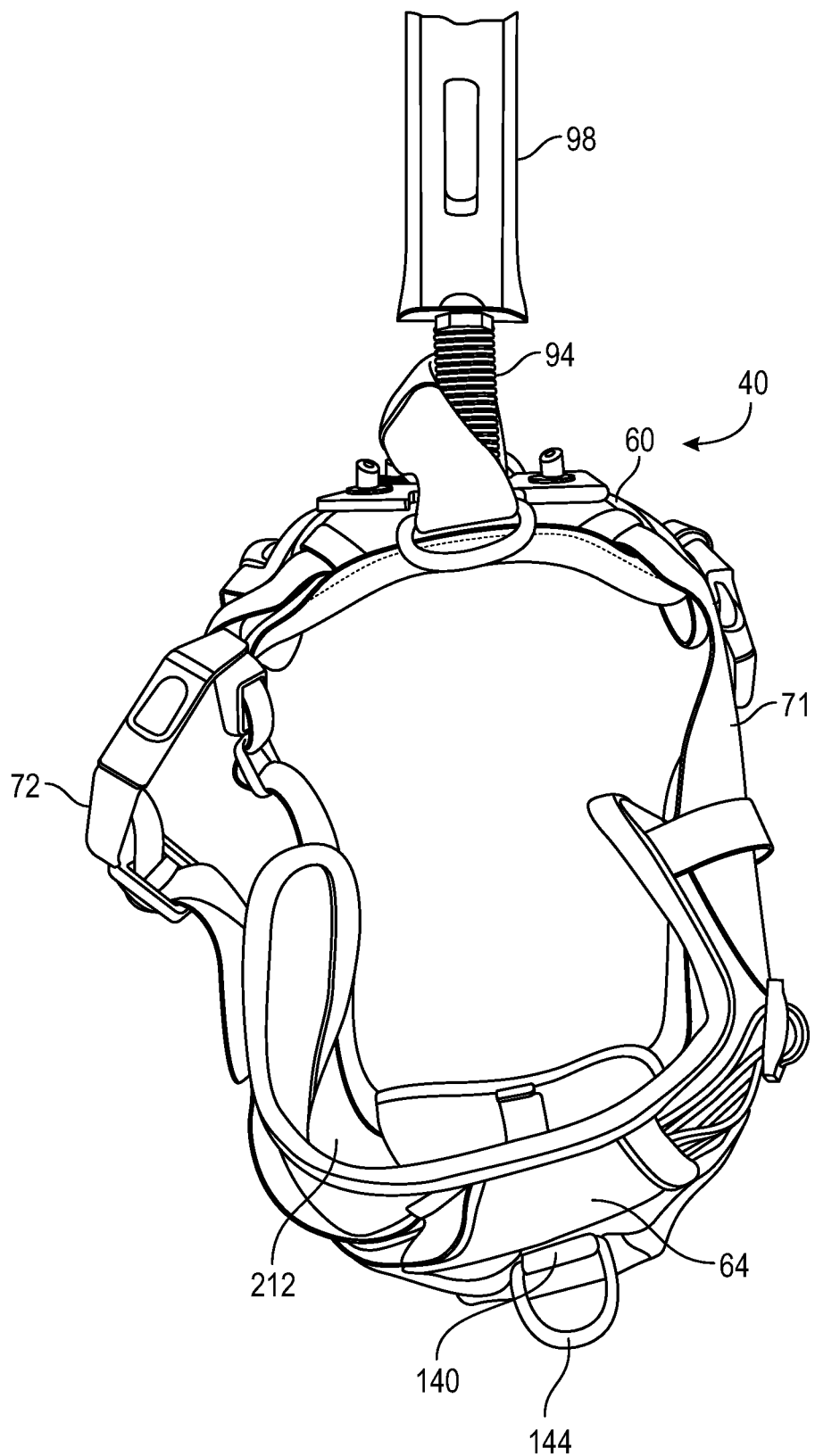
FIG. 5 is a front view of the dog locating device of FIG. 1 without having a flag thereon.

Referring to FIGS. 1 and 5, the first adjustable strap 71, the second adjustable strap 72, the back pad 60, and the abdomen pad 64 form an opening 212 that is sized and shaped to receive a head 42 of the hunting dog 30 therethrough.

Referring to FIGS. 3, 7 and 8, the third adjustable strap 73 is coupled to and between the rear end portion 174 of the back pad 60 and the rear end portion 186 of the abdomen pad 64. The third adjustable strap 73 includes a first strap portion 221, a second strap portion 222, a releasable buckle 226, and an adjustment buckle 230. The first strap portion 221 is coupled to and between the rear end portion 174 of the back pad 60 and the releasable buckle 226. The second strap portion 222 is further coupled to and between the releasable buckle 226 and the adjustment buckle 230, and further extends from the adjustment buckle 230 to the abdomen pad 64. The second strap portion 222 is further coupled to the abdomen pad 64. The adjustment buckle 230 allows a user to adjust an effective length of the third adjustable strap 73. The releasable buckle 226 allows a user to temporarily decouple the first strap portion 221 from the second strap portion 222 when placing the dog locating device 40 on the hunting dog 30.

Figure 6:
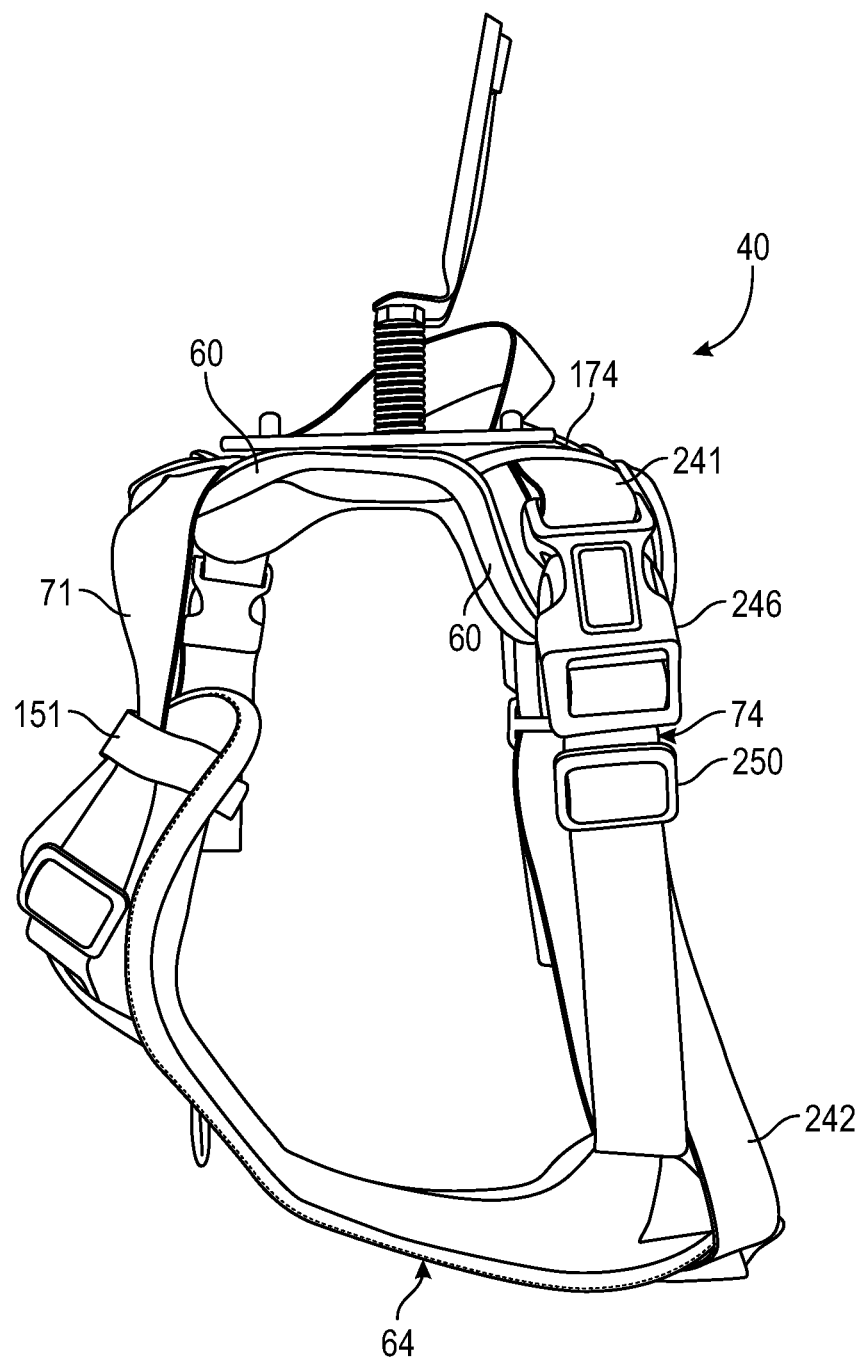
FIG. 6 is a first side view of the dog locating device of FIG. 5.

Referring to FIGS. 3 and 6, the fourth adjustable strap 74 is coupled to and between the rear end portion 174 of the back pad 60 and the rear end portion 186 of the abdomen pad 64. The fourth adjustable strap 74 includes a first strap portion 241, a second strap portion 242, a releasable buckle 246, and an adjustment buckle 250. The first strap portion 241 is coupled to and between the rear end portion 174 of the back pad 60 and the releasable buckle 246. The second strap portion 242 is coupled to and between the releasable buckle 246 and the adjustment buckle 250, and further extends from the adjustment buckle 250 to the abdomen pad 64. The second strap portion 242 is further coupled to the abdomen pad 64. The adjustment buckle 250 allows a user to adjust an effective length of the fourth adjustable strap 74. The releasable buckle 246 allows a user to temporarily decouple the first strap portion 241 from the second strap portion 242 when placing the dog locating device 40 on the hunting dog 30.

Referring to FIG. 5, the third adjustable strap 73, the fourth adjustable strap 74, the back pad 60, and the abdomen pad 64 form an opening 214 that is sized and shaped to receive the back 44 and the abdomen 46 of the hunting dog 30 therethrough.

Figure 15:
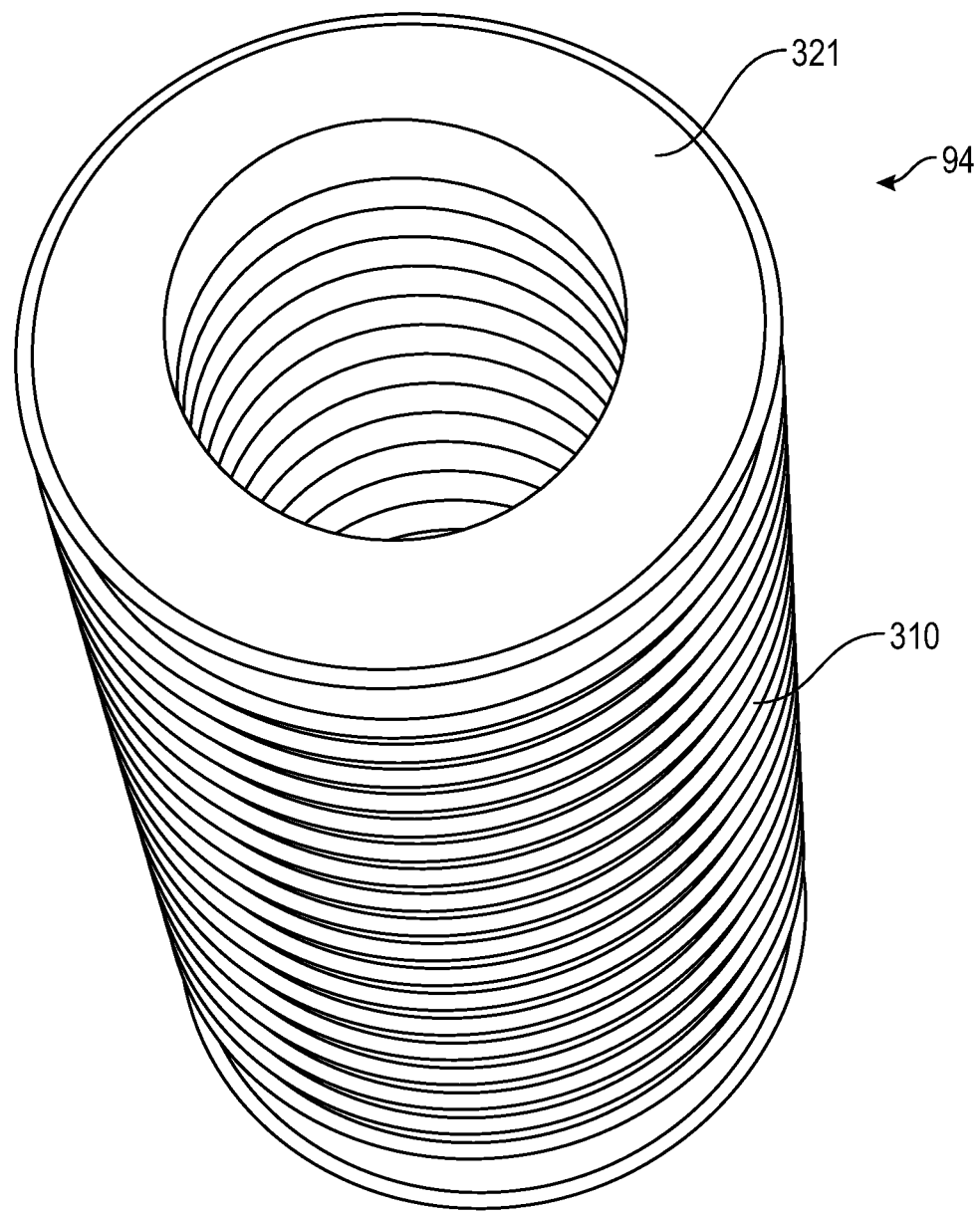
FIG. 15 is a bottom view of the spring member of FIG. 14.
Figure 16:
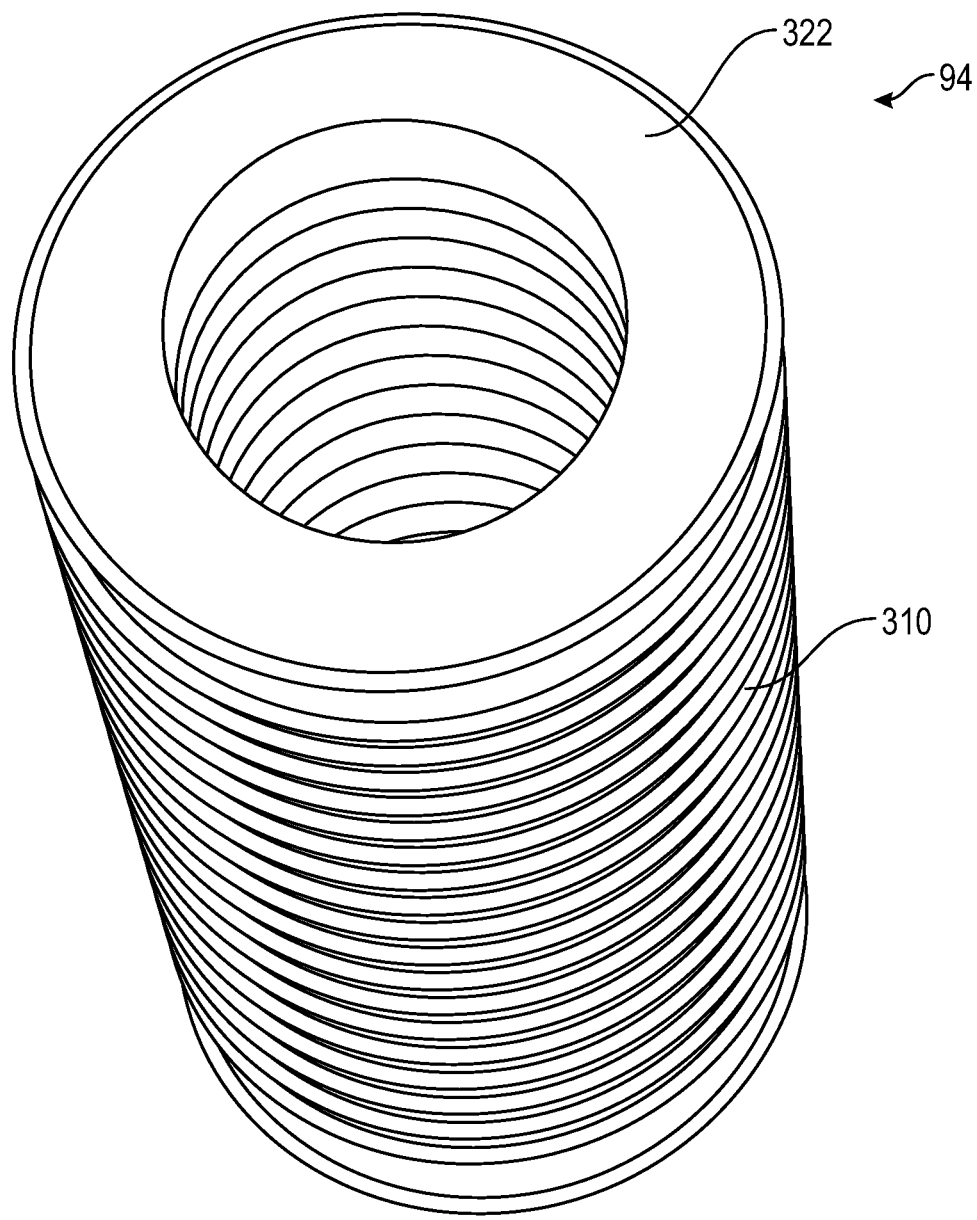
FIG. 16 is a top view of the spring member of FIG. 14.

Referring to FIGS. 9, 12, 13, and 17, the plate 90 is coupled to the back pad 60 and is provided to hold the flag mounting bracket 98 thereon. The plate 90 includes a rectangular-shaped body 270 having a central aperture 274 and first, second, third, and fourth rivet apertures 281, 202, 283, 204 extending therethrough. The plate 90 further includes first and second slots 291, 292 extending therein on opposite ends of the plate 90. In an exemplary embodiment, the plate 90 is constructed of plastic. The plate 90 is coupled to the back pad 60 utilizing first, second, third, and fourth rivets 101, 102, 103, 104 that extend through the first, second, third, and fourth rivet apertures 281, 202, 283, 204, respectively, and the back pad 60. The plate 90 is coupled to the spring member 94 utilizing a bolt 111 that extends through the central aperture 274 and into the first nut member 321 (shown in FIG. 15) of the spring member 94.

Referring to FIGS. 9 and 14-16, the spring member 94 is provided to be coupled to the plate 90 and to support the flag mounting bracket 98 thereon. The spring member 94 includes a spring 310, a first nut member 321, and a second nut member 322. The first and second nut members 321, 322 are coupled to opposite ends of the spring 310. The first nut member 321 is aligned with the central aperture 274 (shown in FIG. 13) of the plate 90, and the first bolt 111 (shown in FIG. 17) extends through the central aperture 274 and into the first nut member 321 to couple the spring member 94 to the plate 90.

Figure 9:
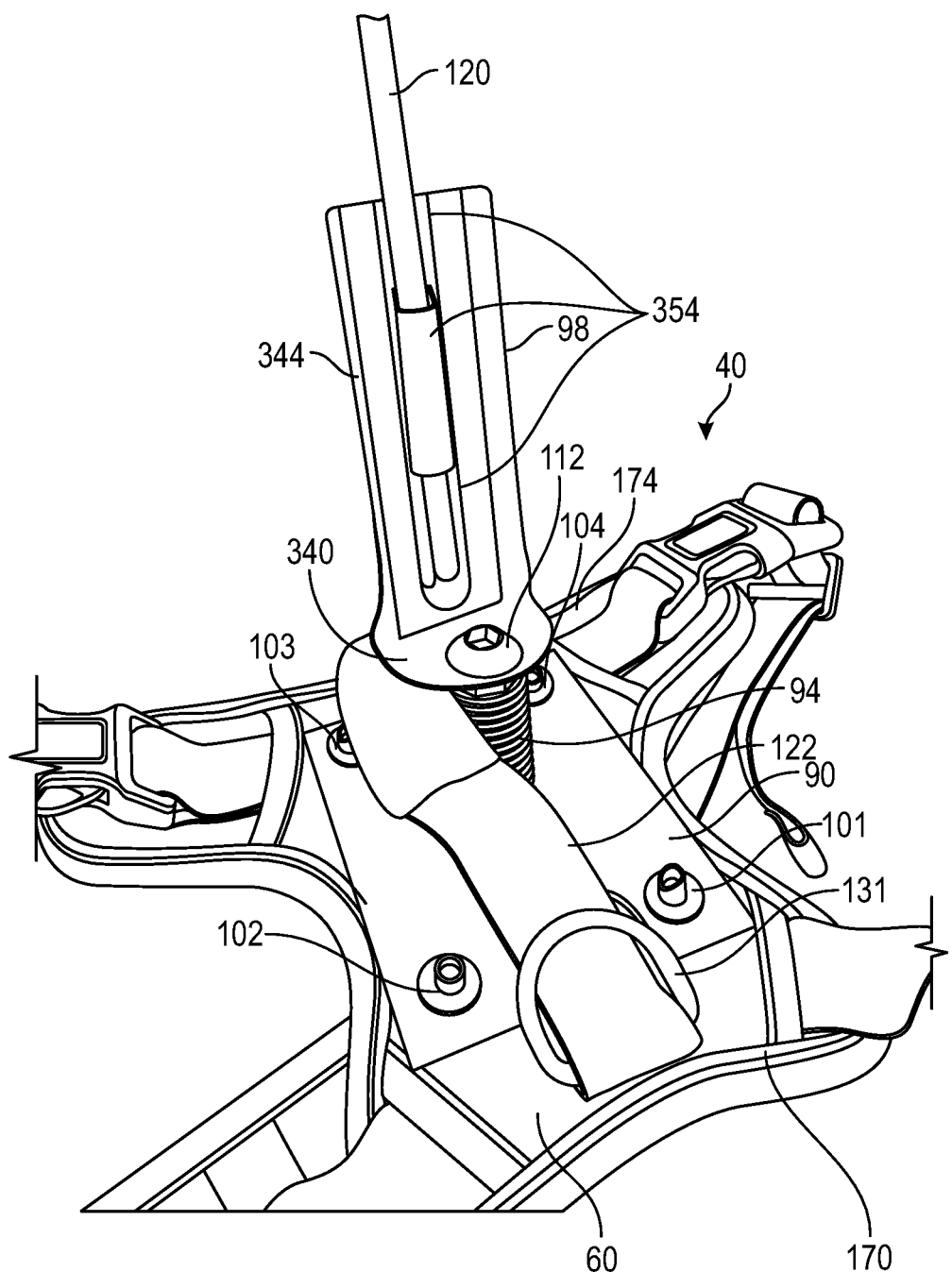
FIG. 9 is an enlarged view of a portion of the dog locating device of FIG. 8.
Figure 10:
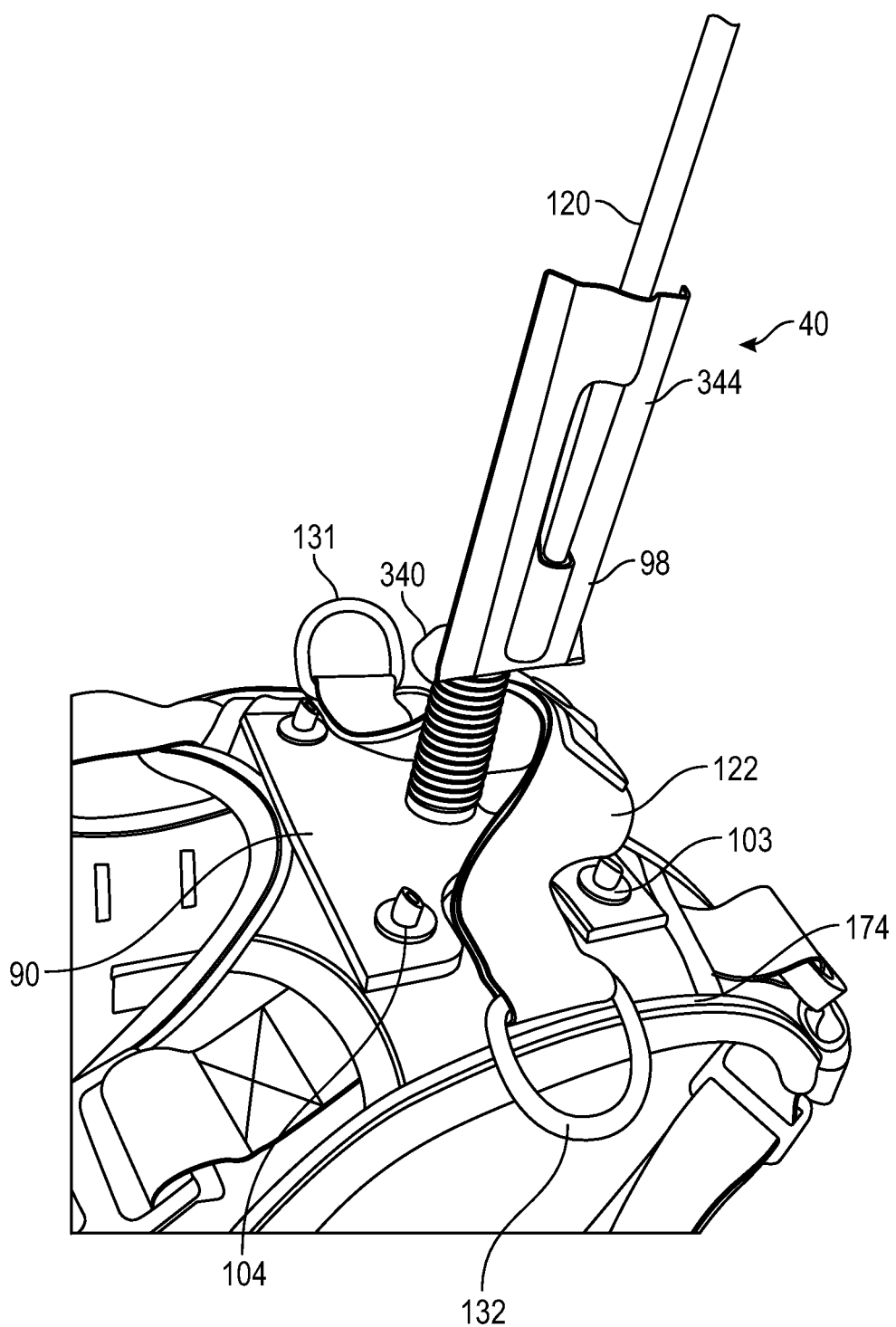
FIG. 10 is another enlarged view of a portion of the dog locating device of FIG. 8.
Figure 18:
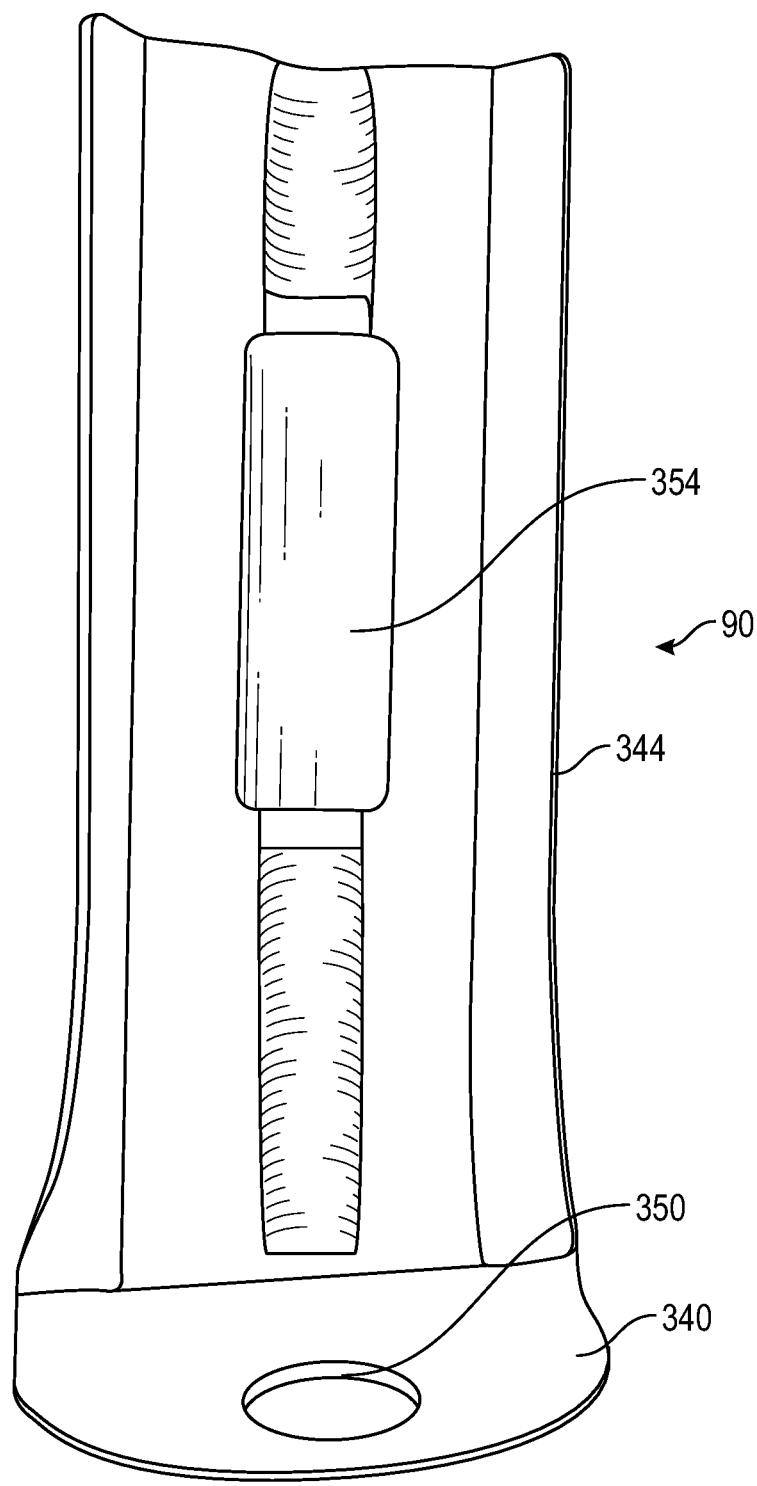
FIG. 18 is an isometric view of a flag mounting bracket utilized in the dog locating device of FIG. 1.

Referring to FIGS. 9, 10 and 18, the flag mounting bracket 98 is provided to removably hold the flag 120 therein. The flag mounting bracket 98 includes a base plate 340 and a flag mounting plate 344. The flag mounting plate 344 is coupled to the base plate 340 and extends substantially perpendicular to the base plate 340. The base plate 340 has a base plate aperture 350 extending therethrough. The base plate aperture 350 is aligned with the second nut member 322 (shown in FIG. 16) of the spring member 94. The second bolt 112 extends through the base plate aperture 350 and into the second nut member 322 to couple the flag mounting bracket 98 to the spring member 94. The flag mounting plate 344 includes a shaft receiving portion 354 that receives the shaft 370 of the flag 120 therein. In an exemplary embodiment, the flag mounting bracket 98 is constructed of metal.

Figure 2:
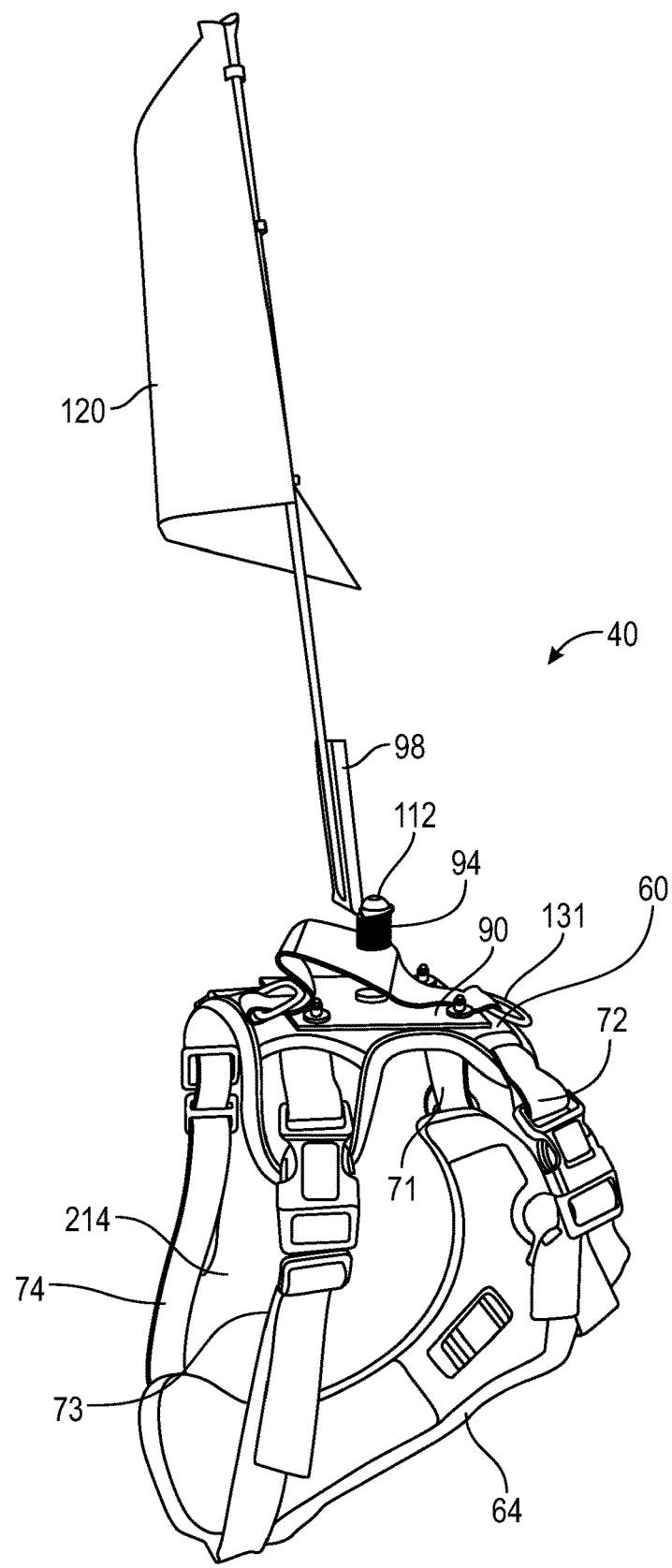
FIG. 2 is an isometric view of the dog locating device of FIG. 1.

Referring to FIGS. 2, 3 and 18, the flag 120 is provided to allow a user to easily see the location of the hunting dog 30. The flag 120 is removably coupled in the flag mounting bracket 98. The flag 120 includes a shaft 370 and the flag portion 374 coupled to the shaft 370. The shaft 370 is removably received within the shaft receiving portion 354 of the flag mounting plate 340.

Referring to FIGS. 9 and 10, the hand strap 122 is provided to allow the hunter 20 to hold the hunting dog 30 at a desired location. The hand strap 122 is coupled to and between the front end portion 170 of the back pad 60 and the rear end portion 174 of the back pad 60.

The coupling ring 131 is provided to allow the hunter 20 to couple a leash to the coupling ring 131. The coupling ring 131 is coupled to the hand strap 122 at the front end portion 170 of the back pad 60.

The coupling ring 132 is provided to allow the hunter 20 to couple a leash to the coupling ring 132. The coupling ring 132 coupled to the hand strap 122 at the rear end portion 174 of the back pad 60.

Referring to FIG. 11, the lower strap 140 is coupled to the abdomen pad 64. The coupling ring 144 is coupled to the lower strap 140 and is provided to allow the hunter 20 to couple a leash to the coupling ring 144.

The dog locating device 40 can be used in non-hunting applications such as on walking dogs and parade dogs. Further, the size and shape of the flag 120 may be varied based on the type of non-hunting application or hunting application.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A dog locating device to be worn by a hunting dog, comprising:
   a back pad having a front end portion and a rear end portion thereof;
   an abdomen pad having a front end portion and a rear end portion thereof;
   a first adjustable strap being coupled to and between the front end portion of the back pad and the front end portion of the abdomen pad;
   a second adjustable strap being coupled to and between the front end portion of the back pad and the front end portion of the abdomen pad; the first adjustable strap, the second adjustable strap, the back pad, and the abdomen pad forming a first opening being sized and shaped to receive a head of the hunting dog therethrough;
   a third adjustable strap being coupled to and between the rear end portion of the back pad and the rear end portion of the abdomen pad;
   a fourth adjustable strap being coupled to and between the rear end portion of the back pad and the rear end portion of the abdomen pad; the third adjustable strap, the fourth adjustable strap, the back pad, and the abdomen pad forming a second opening being sized and shaped to receive a back and an abdomen of the hunting dog therethrough;
   a plate being coupled to the back pad, wherein the plate has a central aperture extending therethrough;
   a first bolt;
   a spring member being coupled to the plate, the spring member having a spring and first and second nut members, the first and second nut members being coupled to opposite ends of the spring the first nut member being aligned with the central aperture of the plate and the first bolt extending through the central aperture and into the first nut member to couple the spring member to the plate; and
   a flag mounting bracket being coupled to the spring member.

2. The dog locating device of claim 1, further comprising:
   a flag having a shaft and a flag portion, the flag portion being coupled to the shaft; and
   the shaft being removably coupled to the flag mounting bracket.

3. The dog locating device of claim 1, further comprising:
   a second bolt;
   the flag mounting bracket having a base plate and a flag mounting plate, the flag mounting plate being coupled to the base plate and extending substantially perpendicular to the base plate;
   the base plate having a base plate aperture extending therethrough;
   the base plate aperture being aligned with the second nut member of the spring member;
   the second bolt extending through the base plate aperture and into the second nut member to couple the flag mounting bracket to the spring member.

4. The dog locating device of claim 1, further comprising:
   first, second, third, and fourth rivets;
   the plate having first, second, third, and fourth rivet apertures extending therethrough;
   the first, second, third, and fourth rivets extending through the first, second, third, and fourth rivet apertures, respectively, and the back pad to couple the plate to a top surface of the back pad.

5. The dog locating device of claim 1, further comprising:
a hand strap being coupled to and between the front end portion of the back pad and the rear end portion of the back pad;
a first coupling ring being coupled to the hand strap at the front end portion; and
a second coupling ring being coupled to the hand strap at the rear end portion.

6. The dog locating device of claim 1, further comprising:
a lower strap being coupled to the abdomen pad; and
a coupling ring being coupled to the lower strap.

7. The dog locating device of claim 1, wherein:
the first adjustable strap includes an adjustment buckle thereon.

8. The dog locating device of claim 1, wherein:
the second adjustable strap includes a releasable buckle and an adjustment buckle thereon.

9. The dog locating device of claim 1, wherein:
the third adjustable strap includes a releasable buckle and an adjustment buckle thereon.

10. The dog locating device of claim 1, wherein:
the fourth adjustable strap includes a releasable buckle and an adjustment buckle thereon.

11. A dog locating device to be worn by a hunting dog, comprising:
a back pad having a front end portion and a rear end portion thereof;
an abdomen pad having a front end portion and a rear end portion thereof;
a first adjustable strap being coupled to and between the front end portion of the back pad and the front end portion of the abdomen pad;
a second adjustable strap being coupled to and between the front end portion of the back pad and the front end portion of the abdomen pad; the first adjustable strap, the second adjustable strap, the back pad, and the abdomen pad forming a first opening being sized and shaped to receive a head of the hunting dog therethrough;
a third adjustable strap being coupled to and between the rear end portion of the back pad and the rear end portion of the abdomen pad;
a fourth adjustable strap being coupled to and between the rear end portion of the back pad and the rear end portion of the abdomen pad; the third adjustable strap, the fourth adjustable strap, the back pad, and the abdomen pad forming a second opening being sized and shaped to receive a back and an abdomen of the hunting dog therethrough;
a plate being coupled to the back pad, plate having a central aperture extending therethrough;
a first bolt;
a spring member being coupled to the plate, the spring member having a spring and first and second nut members, the first and second nut members being coupled to opposite ends of the spring the first nut member being aligned with the central aperture of the plate and the first bolt extending through the central aperture and into the first nut member to couple the spring member to the plate; and
a flag mounting bracket being coupled to the spring member;
a second bolt;
the flag mounting bracket having a base plate and a flag mounting plate, the flag mounting plate being coupled to the base plate and extending substantially perpendicular to the base plate the base plate having a base plate aperture extending therethrough, the base plate aperture being aligned with the second nut member of the spring member and the second bolt extending through the base plate aperture and into the second nut member to couple the flag mounting bracket to the spring member.

12. The dog locating device of claim 11, further comprising:
a flag having a shaft and a flag portion, the flag portion being coupled to the shaft; and
the shaft being removably coupled to the flag mounting bracket.

13. The dog locating device of claim 11, further comprising:
first, second, third, and fourth rivets;
the plate having first, second, third, and fourth rivet apertures extending therethrough;
the first, second, third, and fourth rivets extending through the first, second, third, and fourth rivet apertures, respectively, and the back pad to couple the plate to a top surface of the back pad.

14. The dog locating device of claim 11, further comprising:
a hand strap being coupled to and between the front end portion of the back pad and the rear end portion of the back pad;
a first coupling ring being coupled to the hand strap at the front end portion; and
a second coupling ring being coupled to the hand strap at the rear end portion.

15. The dog locating device of claim 11, further comprising:
a lower strap being coupled to the abdomen pad; and
a coupling ring being coupled to the lower strap.

16. The dog locating device of claim 11, wherein:
the first adjustable strap includes an adjustment buckle thereon.

17. The dog locating device of claim 11, wherein:
the second adjustable strap includes a releasable buckle and an adjustment buckle thereon.

18. The dog locating device of claim 11, wherein:
the third adjustable strap includes a releasable buckle and an adjustment buckle thereon.

19. The dog locating device of claim 11, wherein:
the fourth adjustable strap includes a releasable buckle and an adjustment buckle thereon.

* * * * *